United States Patent
Loewen et al.

(10) Patent No.: US 10,466,917 B2
(45) Date of Patent: Nov. 5, 2019

(54) INDIRECTION STRUCTURE PREFETCH BASED ON PRIOR STATE INFORMATION

(71) Applicant: Intel Corporation, Santa Clara, CA (US)

(72) Inventors: Myron Loewen, Berthoud, CO (US); Sanjeev N. Trika, Portland, OR (US)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 15/721,493

(22) Filed: Sep. 29, 2017

(65) Prior Publication Data

US 2019/0102096 A1    Apr. 4, 2019

(51) Int. Cl.
*G06F 3/06* (2006.01)
*G06F 12/02* (2006.01)

(52) U.S. Cl.
CPC .......... *G06F 3/0625* (2013.01); *G06F 3/0634* (2013.01); *G06F 3/0655* (2013.01); *G06F 3/0679* (2013.01); *G06F 12/0215* (2013.01); *G06F 12/0246* (2013.01); *G06F 2212/1028* (2013.01); *G06F 2212/654* (2013.01); *G06F 2212/7201* (2013.01)

(58) Field of Classification Search
CPC ............... G06F 3/0625; G06F 12/0215; G06F 12/0246; G06F 3/0634; G06F 3/0655; G06F 3/0679; G06F 2212/654; G06F 2212/7201
USPC .......................................... 711/202, 206, 103
See application file for complete search history.

(56) References Cited

U.S. PATENT DOCUMENTS

| | | | |
|---|---|---|---|
| 9,323,542 B2 | 4/2016 | Ratn et al. | |
| 2006/0182031 A1* | 8/2006 | Tran | H04L 49/90 370/235 |
| 2010/0169710 A1* | 7/2010 | Royer, Jr. | G06F 11/1441 714/22 |
| 2011/0035534 A1* | 2/2011 | Vogan | G06F 12/0246 711/103 |
| 2016/0142512 A1* | 5/2016 | Dickinson | H04L 67/1097 709/219 |
| 2018/0267706 A1* | 9/2018 | Li | G06F 3/061 |
| 2019/0042460 A1* | 2/2019 | Trika | G06F 12/1009 |
| 2019/0043604 A1* | 2/2019 | Baca | G11C 29/70 |

OTHER PUBLICATIONS

Microsoft, "Link power management mode—HIPM/DIPM", 2017, 2 pages, Microsoft.
Microsoft, "System Power States", 2017, 7 pages, Microsoft.
Microsoft, "Link power Management (LPM) in USB 2.0", Nov. 15, 2013, 12 pages, Microsoft.
Microsoft, "Device Power States", Jun. 16, 2017, 3 pages, Microsoft.

* cited by examiner

*Primary Examiner* — Hong C Kim
(74) *Attorney, Agent, or Firm* — Jordan IP Law, LLC

(57) ABSTRACT

An embodiment of a semiconductor package apparatus may include technology to determine prior state information corresponding to one or more of a power state, a system state, a device state, and an operating system state, and load an indirection structure for a persistent storage media in the background based on the prior state information. Other embodiments are disclosed and claimed.

24 Claims, 7 Drawing Sheets

| Previous SSD Power-Down type/reason | Priority of L2P segments to load |
|---|---|
| S5 (Normal shutdown) | P1) Demand reads/writes<br>P2) L2P segments corresponding to the LBAs in the boot set<br>P3) L2P segments corresponding to the LBAs in the runtime-set<br>P4) All other L2P segments in sequential order until DRAM/SRAM space for L2P is full (applies primarily for non-L2P-paged cases; for L2P-paged cases, this priority set may be a null set) |
| S4 (hibernate) | P1) Demand reads/writes<br>P2) L2P segments corresponding to the LBAs in the hiberfile-set<br>P3) L2P segments corresponding to the LBAs in the runtime-set<br>P4) Same as P4 above. |
| S3 (standby) | P1) Demand reads/writes<br>P2) L2P segments corresponding to the LBAs in the runtime-set<br>P3) Same as P4 above |
| Surprise Power-fail | Same prioritization as for restart after S5 |
| Any other reason | Same prioritization as for resume after S3 |

FIG. 5

INDIRECTION STRUCTURE PREFETCH BASED ON PRIOR STATE INFORMATION

TECHNICAL FIELD

Embodiments generally relate to memory systems, and more particularly, embodiments relate to an indirection table prefetch based on a power state.

BACKGROUND

Electronic storage systems may include any of a number of storage devices including, for example, a solid-state drive (SSD). When restarting, or waking up, the system may need to load a logical-to-physical (L2P) table to access information stored on the SSD.

BRIEF DESCRIPTION OF THE DRAWINGS

The various advantages of the embodiments will become apparent to one skilled in the art by reading the following specification and appended claims, and by referencing the following drawings, in which:

FIG. 5 is an illustrative diagram of an example of a priority table according to an embodiment;

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with nonvolatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
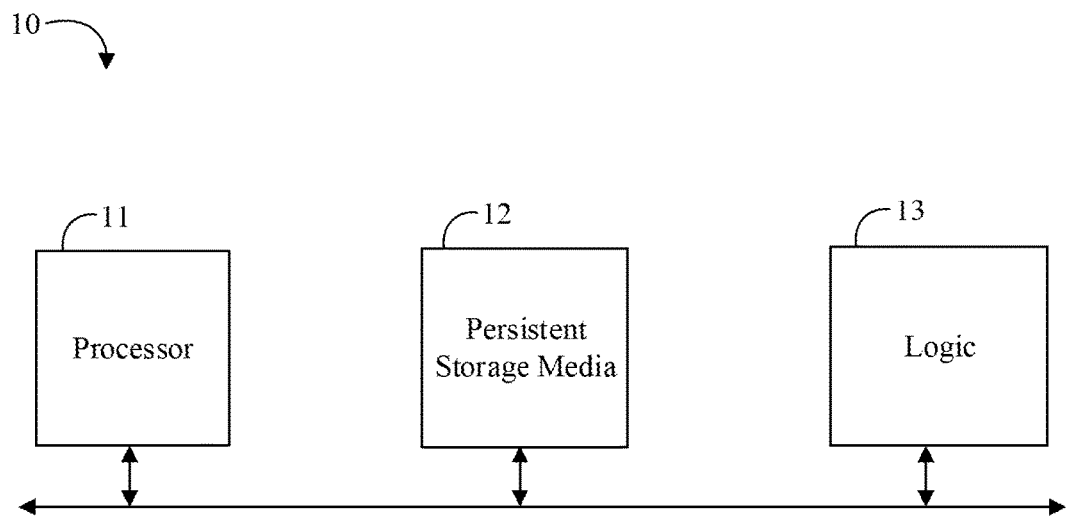
FIG. 1 is a block diagram of an example of an electronic processing system according to an embodiment.

Turning now to FIG. 1, an embodiment of an electronic processing system 10 may include a processor 11, persistent storage media 12 communicatively coupled to the processor 11, and logic 13 communicatively coupled to the persistent storage media 12 to determine prior state information corresponding to one or more of a power state, a system state, a device state, and an operating system state, and to load an indirection structure for the persistent storage media 12 in the background based on the prior state information. In some embodiments, the logic 13 may be configured to receive an indication of a transition related to the persistent storage media 12 and state information related to the transition, and save the transition-related state information prior to the transition. The logic 13 may also be configured to determine prior media context information, and load the indirection structure in the background based on the prior state information and the prior media context information. In some embodiments, the logic 13 may also be configured to prioritize a first portion of the indirection structure to be loaded before a second portion of the indirection structure based on one or more of the prior state information and the prior media context information. For example, the logic 13 may be configured to save a set of recently used logical block addresses as part of the prior media context information. In some embodiments, the persistent storage media may include a SSD and the indirection structure may include a L2P translation table.

Embodiments of each of the above processor 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12, main memory, or other system memory may store a set of instructions which when executed by the processor 11 cause the system 10 to implement one or more components, features, or aspects of the system 10 (e.g., the logic 13; determining prior state information corresponding to one or more of a power state, a system state, a device state, and an operating system state; loading an indirection structure for the persistent storage media 12 in the background based on the prior state information; etc.).

Figure 2:
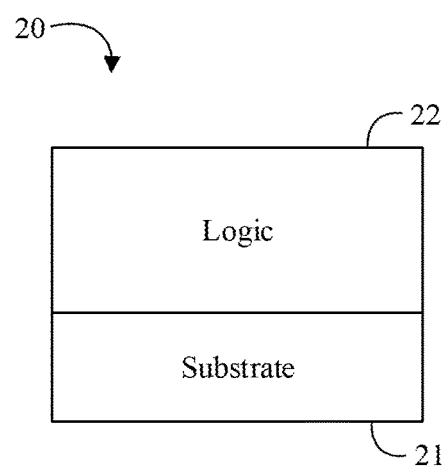
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate, where the logic 22 is at least partly implemented in one or more of configurable logic and fixed-functionality hardware logic. The logic 22 coupled to the substrate 21 may be configured to determine prior state information corresponding to one or more of a power state, a system state, a device state, and an operating system state, and load an indirection structure for a persistent storage media in the background based on the prior state information. In some embodiments, the logic 22 may be configured to receive an indication of a transition related to the persistent storage media and state information related to the transition, and save the transition-related state information prior to the transition. The logic 22 may also be configured to determine prior media context information, and load the indirection structure in the background based on the prior state information and the prior media context information. In some embodiments, the logic 22 may also be configured to prioritize a first portion of the indirection structure to be loaded before a second portion of the indirection structure based on one or more of the prior state information and the prior media context information. For example, the logic 22 may be configured to save a set of recently used logical block addresses as part of the prior media context information. In some embodiments, the persistent storage media may include a SSD and the indirection structure may include a L2P translation table.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. In some embodiments, all or portions of the logic 22 may be implemented as hardware state machines. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
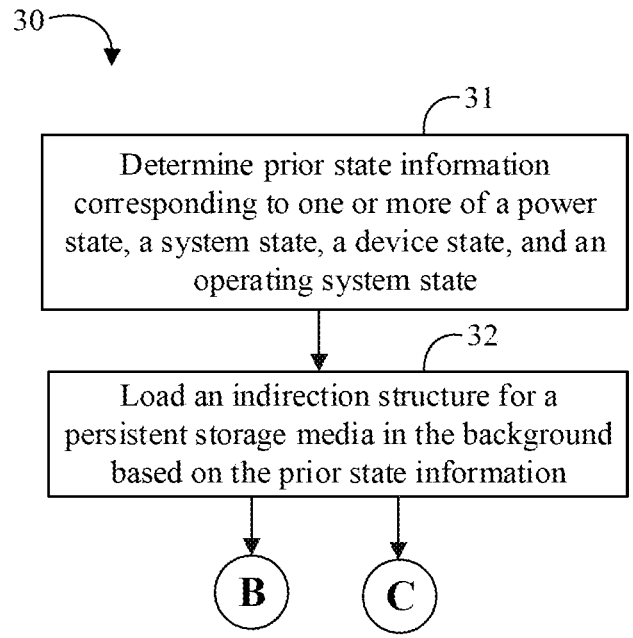
FIGS. 3A to 3C are flowcharts of an example of a method of controlling a persistent storage media according to an embodiment.
Figure 3B:
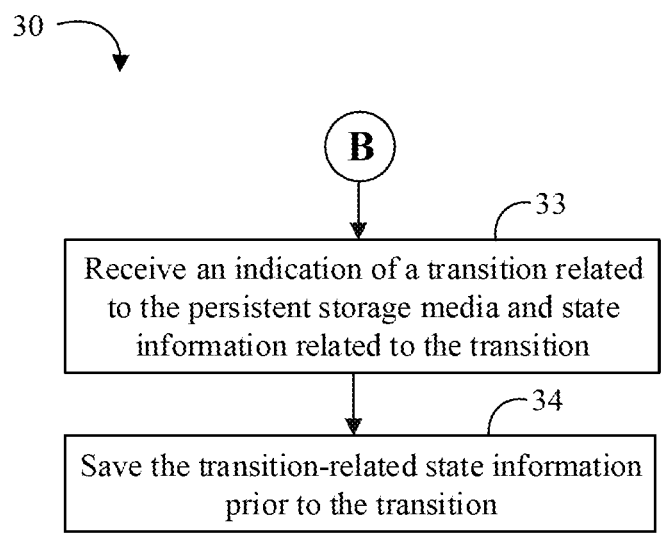
Figure 3C:
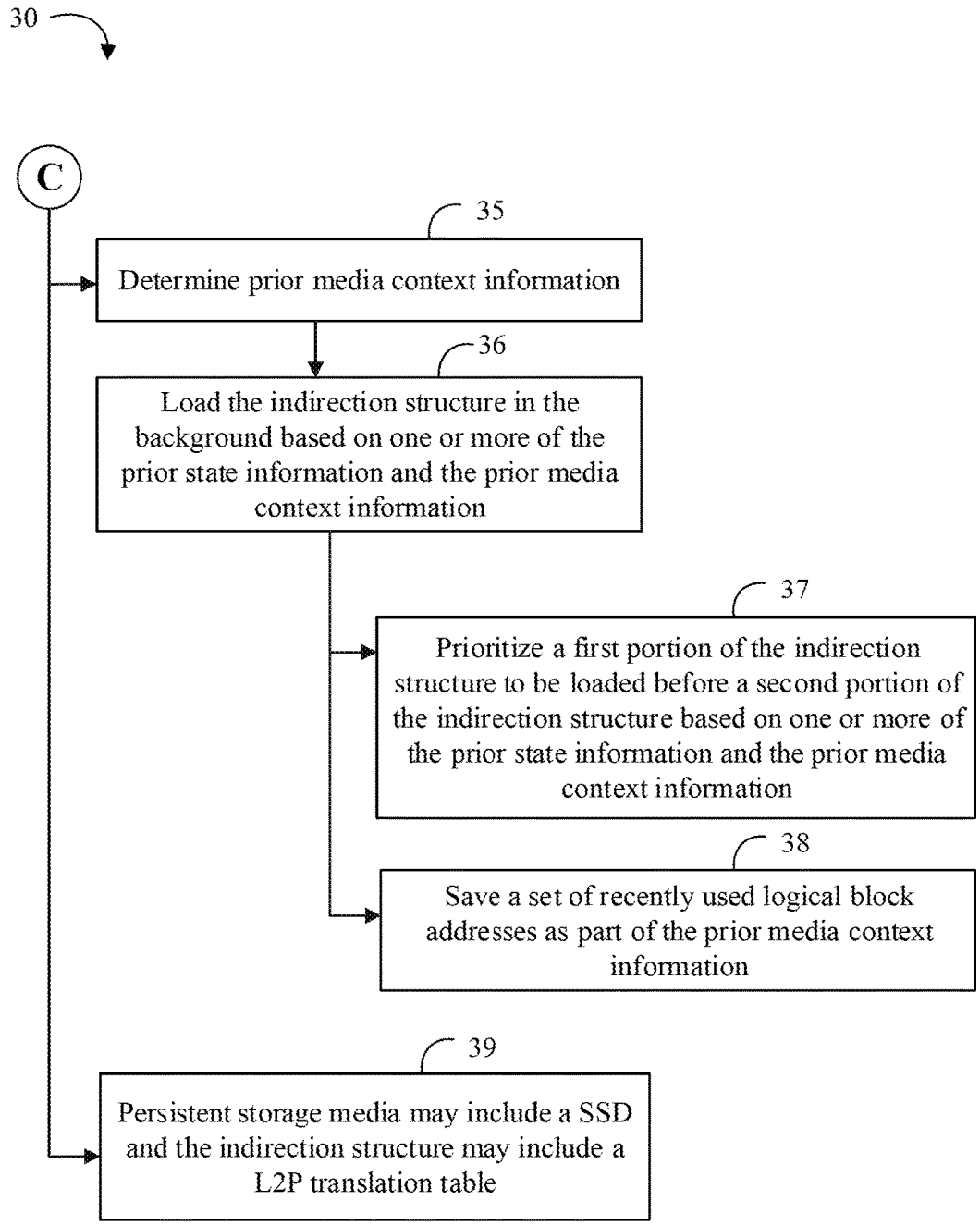

Turning now to FIGS. 3A to 3C, an embodiment of a method 30 of controlling a persistent storage device may include determining prior state information corresponding to one or more of a power state, a system state, a device state, and an operating system state at block 31, and loading an indirection structure for a persistent storage media in the background based on the prior state information at block 32. Some embodiments of the method 30 may also include receiving an indication of a transition related to the persistent storage media and state information related to the transition at block 33, and saving the transition-related state information prior to the transition at block 34. The method 30 may also include determining prior media context information at block 35, and loading the indirection structure in the background based on one or more of the prior state information and the prior media context information at block 36. Some embodiments of the method 30 may also include prioritizing a first portion of the indirection structure to be loaded before a second portion of the indirection structure based on one or more of the prior state information and the prior media context information at block 37. For example, the method 30 may include saving a set of recently used logical block addresses as part of the prior media context information at block 38. In some embodiments, the persistent storage media may include a SSD and the indirection structure may include a L2P translation table at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
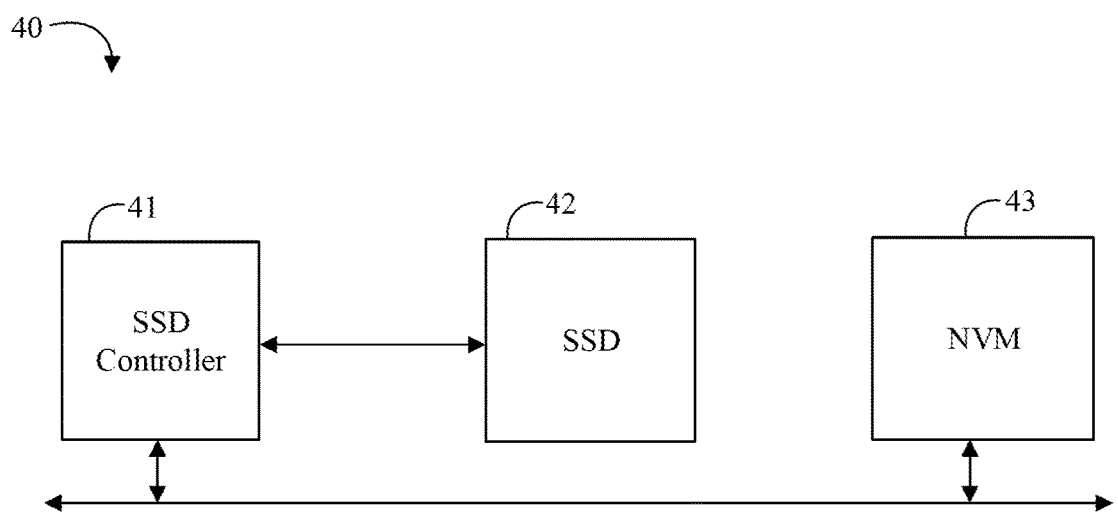
FIG. 4 is a block diagram of an example of a storage system according to an embodiment.

Turning now to FIG. 4, an embodiment of a storage system 40 may include a SSD controller 41 communicatively coupled to a SSD 42 and a nonvolatile media (NVM) 43. The SSD controller 41 may be configured to determine prior state information corresponding to one or more of a power state, a system state, a device state, and an operating system state. For example, the SSD controller 41 may be configured to receive an indication of a transition related to the SSD and state information related to the transition from an OS, and to save the transition-related state information prior to the transition. For example, the transition-related state information may be saved to the NVM 43. The SSD controller 41 may be further configured to load an L2P table for the SSD 42 in the background based on the prior state information. For example, the L2P table may be stored in the NVM 43. In some embodiments, the SSD controller 41 may also be configured to determine prior drive context information, and load the L2P table in the background based on the prior state information and the prior drive context information. For example, the SSD controller 41 may save a set of recently used logical block addresses (LBAs) as part of the prior drive context information, and then prioritize loading the portion of the L2P which corresponds to that set of LBAs before other portions of the L2P table (e.g., based on the set of recently used LBAs being included with the saved prior drive context information). For example, the drive context information and/or the set of recently used LBAs may be saved to the NVM 43 prior to shutdown.

Embodiments of the SSD controller 41, the SSD 42, the NVM 43, and other components of the storage system 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide a power state aware intelligent L2P prefetch technique. The boot/resume-speed of a system, and consequently, the startup time of a SSD, may be an important performance metric that impacts users and solution providers. In some systems, the startup time of a SSD on a clean boot/resume (e.g., not after a power fail) may largely be dominated by the time it takes to load its internal indirection table (e.g., a L2P table). Some other systems may utilize a background L2P load to reduce the startup time. Some other systems may also provide an on-demand L2P load and data load for accessed LBAs not currently loaded during startup and for workloads post startup. Some embodiments may provide further improvements to the startup process by performing the background load of the L2P in a usage-oriented pattern (e.g., instead of a sequential load order). Some embodiments may also improve the runtime read performance of a SSD post-startup by eliminating a double read for some post-startup SSD accesses at the time of the access (e.g., where the first read corresponds to loading the L2P table and the second read corresponds to reading the data). Some embodiments may combine a usage-oriented L2P load with an on-demand L2P load and/or a background sequential L2P load.

In some embodiments, the host may be configured to communicate the nature of the transition (e.g., shutdown/hibernate/standby/etc.) to the SSD, and the SSD may save this information and use it to improve or optimize the next startup. For example, the host may inform the SSD of the reason for a requested SSD-shutdown (e.g., sending power state information such as S5, S4, S3, etc., to the SSD). The SSD may save this power-state-transition information in NVM. The SSD may also save information to the NVM related to LBAs accessed on a previous startup and/or those that may have been recently accessed prior to the shutdown. The SSD, upon initialization, may then intelligently load the L2P data, using information from the previous accesses to the SSD and from the nature of the prior shutdown. On a next/subsequent startup, for example, the SSD may use the saved information to first prefetch the L2P entries (e.g., during in a background load) corresponding to the L2P entries that are expected to be used immediately and/or shortly after startup. Advantageously, loading the L2P entries in the background in an order based on how the SSD shutdown and/or based on expected drive accesses soon after startup (e.g., as opposed to a sequential order) may improve the startup time/process and may reduce the need for handling on-demand L2P loading which may interrupt the background L2P load (e.g., because many of those early access requests may correspond to pre-fetched L2P entries which may then advantageously need only one read for the data read).

Some embodiments may include both host-side implementations and device-side implementations. On the host-side, some embodiments may provide information about the reason for a shutdown together with the request to shutdown a storage device (e.g., standby-immediate). For example, the OS and/or a device-driver may be configured to pass state information to the storage device along with the shutdown request. The state information may relate to the requested transition. For example, the state information may include power states, system states, device states, etc. In some embodiments, the power states may include S5 (e.g., system shutdown), S4 (e.g., system hibernate), S3 (e.g., system standby), host initiated power mode (HIPM), device initiated power mode (DIPM), etc. Device states may include D2 (e.g., device specific low power state), D3 (e.g., device specific lower power state), etc. and may be extended to include other states. In some embodiments, the host may send the relevant state information to the SSD as a hint command just prior to sending the device-shutdown command. Alternatively, or additionally, in some embodiments the host may send the relevant information with an extended version of the device-shutdown command. Either of these embodiments may be implemented as vendor-specific commands, or as standardized commands (e.g., potentially added to NVM Express (NVMe), serial AT attachment (SATA), small computer system interface (SCSI), serial attached SCSI (SAS), or other specifications).

On the storage device side, the drive may maintain information about boot-time-LBAs and recently-accessed LBAs. For example, some embodiments may track a number of LBAs accessed by the host upon boot from a S5/Power-failure event, and may save that LBA information to NVM after those accesses (or anytime afterwards) in a set of LBAs (e.g., which may hereinafter be referred to as the boot-set). Some embodiments may also track and save a number of LBAs accessed on startup after a S4 event (e.g., this set of LBAs may hereinafter be referred to as the hiberfile-set).

Some embodiments may also track and save a number of LBAs corresponding to recently used LBAs (e.g., this set of LBAs may hereinafter be referred to the runtime-set). For example, the runtime-set may be built using a cyclic-buffer, a linked list, and/or other technique for collecting a configurable number of most-recently used LBAs accessed by the host during runtime. The runtime set may be saved to the NVM upon a shutdown request. In the event of a clean drive-startup, the device may load L2P segments (e.g., portions of the L2P) in a priority order. The priority order may be specified in a table or other suitable data structure. In case of a drive-startup after a surprise-power-failure, some embodiment may first complete power loss recovery (PLR), and then load the L2P segments as in a priority order.

Turning now to FIG. 5, an embodiment of a priority table includes several different L2P load priority orders corresponding to different system power states. For a startup from a prior S5 state (e.g., normal shutdown), the system may first load L2P segments corresponding to demand reads/writes, followed by L2P segments corresponding to the LBAs in the boot set, followed by L2P segments corresponding to the LBAs in the runtime-set, followed by all other L2P segments in sequential order (e.g., until DRAM/SRAM space for L2P is full in a system without L2P-paging). For a startup from a prior S4 state (e.g., hibernate), the system may first load L2P segments corresponding to demand reads/writes, followed by L2P segments corresponding to the LBAs in the hiberfile set, followed by L2P segments corresponding to the LBAs in the runtime-set, followed by all other L2P segments in sequential order. For a startup from a prior S3 state (e.g., standby), the system may first load L2P segments corresponding to demand reads/writes, followed by L2P segments corresponding to the LBAs in the runtime-set, followed by all other L2P segments in sequential order. For a startup from a surprise power failure, the system may first complete PLR and then follow the same priority order corresponding the S5 state. For any other prior state/reason, the system may follow the same priority order corresponding to the S3 state.

In other embodiments, more or fewer sets of LBAs may be maintained, and more or fewer entries in the priority data structure may be provided to specify L2P load priorities for more or fewer relevant states. In some embodiments, the states and/or corresponding priority orders may be configurable. In some embodiments, the states and/or priority orders may be implemented with hardware state machines and/or fixed function logic (e.g., such that no table or other data structure needs to read/loaded to implement the L2P priority loads).

In some embodiments, the storage device may save L2P indices, LBA ranges, and/or L2P ranges rather than LBAs in the boot/hiberfile/runtime-sets. In some embodiments, the LBAs may additionally, or alternatively, be grouped into tokenized-sets indexed by tokens, and the boot/hiberfile/runtime-sets may be arranged as collections of these tokens. Information about any of these sets may also be maintained by the host and then passed to the device as part of or in addition to the shutdown command. In some embodiments, multiple boot-sets (e.g., from the last several boots), runtime-sets or hiberfile-sets may be maintained and loaded. Priorities may be made provider/OS/user configurable and/or extensible.

Figure 6:
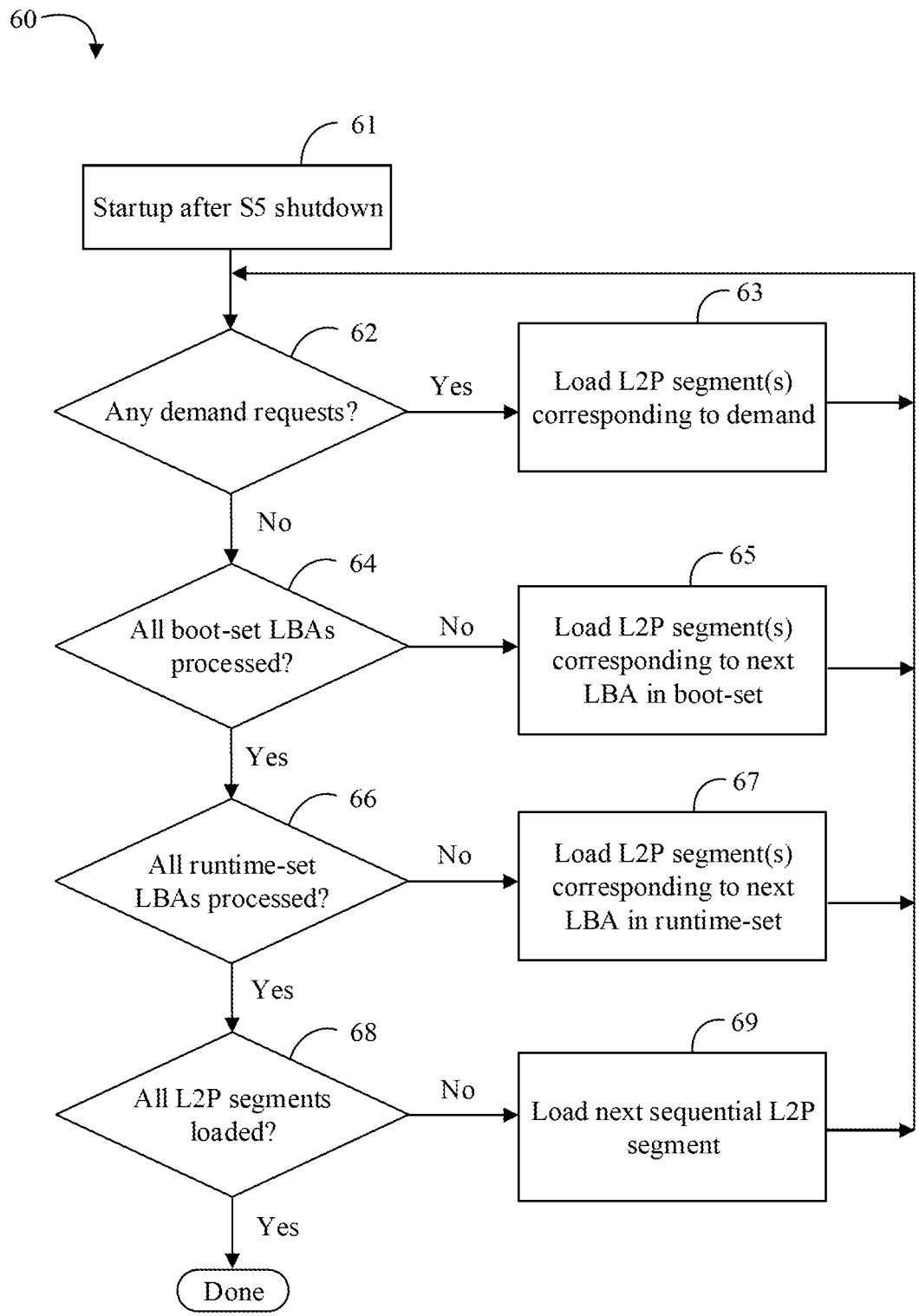
FIG. 6 is a flowchart of an example of a method of priority-based L2P segment loading for a restart from an S5 system power state according to an embodiment.

Turning now to FIG. 6, an embodiment of a method 60 of priority-based L2P segment loading for a restart from an S5 system power state may include starting up following a S5 shutdown at block 61, and determining if any demand read/write needs to be handled at block 62. If so, the method 60 may include loading L2P segment(s) corresponding to the demand at block 63, after which the method 60 may return to block 62. Otherwise, the method 60 may proceed to determine if all boot-set LBAs have been processed at block 64. If not, the method 60 may include loading L2P segment(s) corresponding to the next boot-set LBA at block 65, after which the method 60 may return to block 62. Otherwise, the method 60 may proceed to determine if all runtime-set LBAs have been processed at block 66. If not, the method 60 may include loading L2P segment(s) corresponding to the next runtime-set LBA at block 67, after which the method 60 may return to block 62. Otherwise, the method 60 may proceed to determine if all L2P segments have been background loaded at block 68 and load the next sequential L2P segment at block 69, after which the method 60 may return to block 62.

Figure 7:
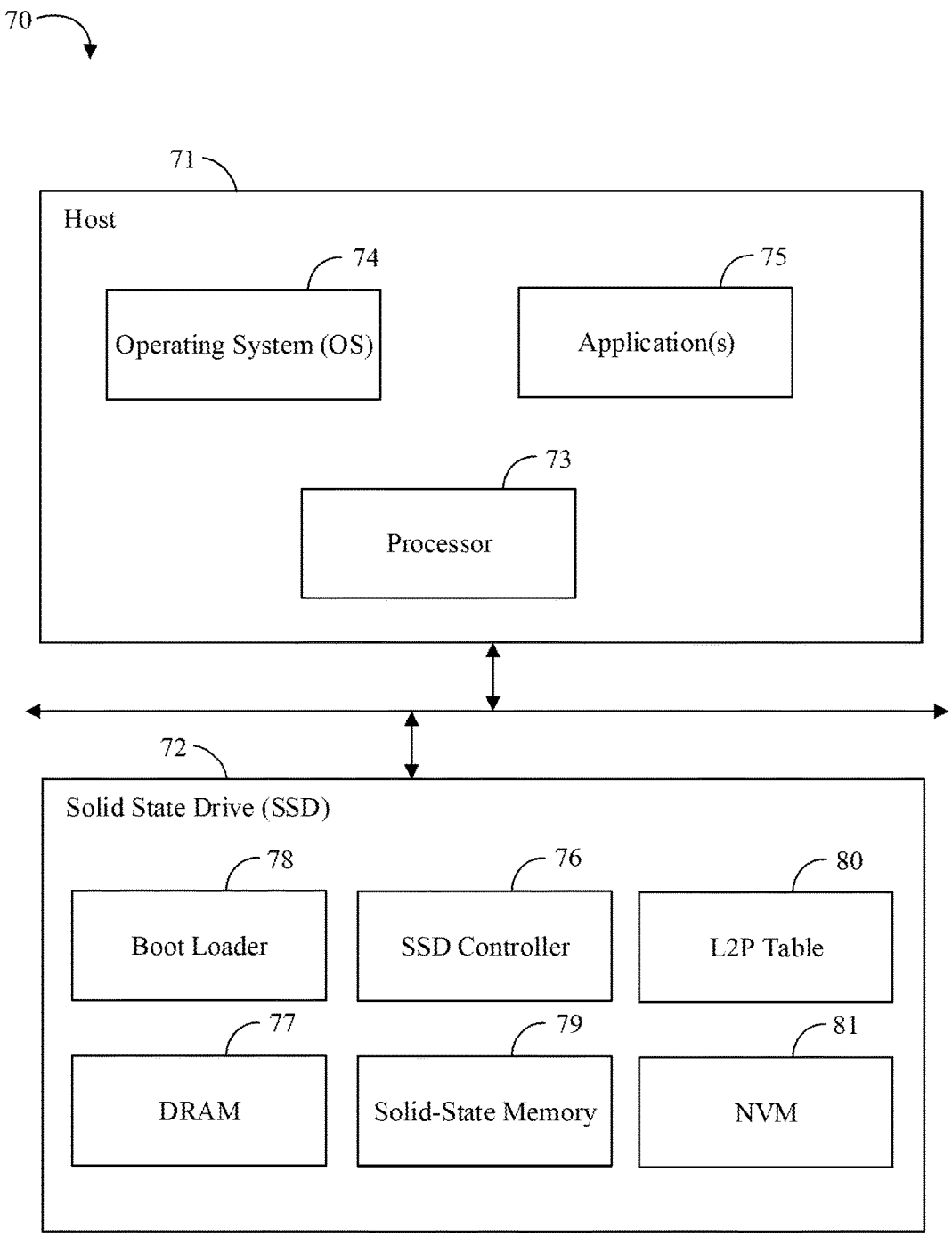
FIG. 7 is a block diagram of another example of an electronic processing system according to an embodiment.

Turning now to FIG. 7, an embodiment of an electronic processing system 70 may include a host 71 in communication with a solid-state drive (SSD) 72 with priority-based L2P loading as described herein. The host 71 may be part of a larger system 70 and may comprise a processor 73, an OS 74, and one or more applications 75. The applications 75 and OS 74 may operate under control of the processor 73. The SSD 72 may be under the control of an SSD controller 76. The SSD 72 may further include a DRAM component 77, a boot loader 78, solid-state memory 79 (e.g., device-managed NAND), a L2P indirection table 80, and other NVM 81 (e.g., a portion of which may be ROM, and a portion of which may be NAND). A power source may be used to provide power to the host 71 and its components as well as the SSD 72 and its components. In some embodiments, the SSD 72 may defer loading the L2P table 80 until after booting. In addition, the L2P table 80 may be paged out to the NVM 81 when idle time is detected, allowing the SSD 72 to be powered down during idle time.

The L2P table 80 may map a LBA to a physical address in memory that actually stores data within the SSD 72. In order to access (e.g., read or write) data into the memory 79, the L2P table 80 (that maps the LBAs used in function calls to a physical memory address where the data is or will be stored) may be loaded.

The boot-up time for an NVM device such as the SSD 72 may include the sum of a hardware power-up boot-up time, NVM boot-up time, boot loader boot-up time and controller initialization time. A relatively long time may be spent in the controller initialization phase. The controller initialization may require more time because it needs to read in (e.g., load) the L2P table 80. Apart from the L2P table 80, the SSD controller 76 may also need to restore certain other data that describes the solid-state memory 79 and states of the SSD 72. This state data may be collectively referred to as the context of the SSD 72. The controller 76 may save the context to the NVM 81 on a clean shutdown and may read the context back on power-up. The L2P table 80 forms a large portion of the context. Therefore, the L2P table 80 load time may comprise a majority of power-on boot-up time for the SSD 72 or other NVM device.

Because the L2P table 80 may be stored in page(s) of the NVM 81 it may not need to be loaded all at once. The L2P table 80 may be divided into segments. For example, a table segment may be a unit of data that may be loaded from the NVM 81 in one operation. For example, a segment size may be the size of one physical page of the NVM 81. The actual size of the segment may depend on the implementation.

On boot-up, SSD controller 76 may load the non-L2P parts of the context and may signal the system 70 that the SSD 72 is ready. The SSD controller 76 may be implemented in any useful combination of hardware and firmware/software. For example, the SSD controller 76 may include an embedded processor to execute SSD control instructions. In another embodiment, the SSD controller 76 may alternatively, or additionally, include hardware state machines configured to provide the control logic of the SSD 72. In still another embodiment, the SSD controller 76 may alternatively, or additionally, share control circuits, logic, and/or firmware/software with the host 71 to provide SSD control functions under the control of the processor 73. Regardless of the implementation, the SSD controller 76 may manage certain aspects of the SSD 72.

In some embodiments, after loading the non-L2P parts of the context the controller 76 may signal the host 71 that the SSD 72 is ready to accept access requests. The controller 76 may then read the prior state and/or drive context information to begin loading segments of the L2P table 80. A data structure referred to as a segment table may track the state of the segments. The segment table may have one entry per segment that indicates the state of the segment. Segments states may comprise one of the following: not loaded; loading; or loaded.

Access requests to the L2P table 80 may be blocked when a segment containing a LBA within the access request has not yet been loaded into the L2P table 80. In that case, the relevant segment may be loaded out of turn (e.g., on-demand loading). Otherwise, the controller 76 may load the L2P segments in a priority order based on the prior state information and/or the prior drive context information (e.g., servicing on-demand requests as needed). After the priority segments have been loaded, the controller 76 may load the remaining segments sequentially (e.g., again servicing on-demand requests as needed).

Priority loading may utilize the time when the SSD 72 may be idle, and may advantageously make it even more likely that segments may already be loaded when they are accessed (e.g., as compared to sequential background loading). On-demand loading may reduce the latency that a request may endure if a requested segment has not yet been loaded. Priority loading the L2P segments corresponding to runtime LBAs may advantageously make it even more likely that such segments may already be loaded when they are accessed (e.g., reducing the number of on-demand requests).

For many applications, I/O accesses may have a high degree of locality meaning that consecutive accesses often hit the same segment. In some cases, only the first access may need a new L2P segment to be loaded. Thus, priority loading based on prior accesses may ensure that latency is reduced or minimized even for early accesses (e.g., when the drive has just booted, restarted, or resumed). During runtime, checking whether a segment is loaded may incur a minimal overhead. Some embodiments may prefetch multiple segments when a segment is accessed. Prefetching multiple segments may accelerate sequential I/O. Furthermore, the segments that are typically accessed on a boot may be detected and may be fetched from a page of the NVM 81 even prior to the first I/O issued from the system 70.

For power-savings, the SSD 72 may enter into a zero power-state by first saving state and drive context information to the NVM 81 on a trigger before powering down. The SSD 72 may then resume quickly as described above when powered back up. The trigger may come from the system 70 when the system 70 does not need the SSD 72 to stay powered. Alternatively, the trigger may be initiated by the SSD 72 itself when it detects idle time (e.g., a threshold amount of time passes since the last I/O). In some implementations of the latter case, the SSD 72 may need to signal the system 70 to request the system 70 to power down the SSD 72. Some embodiments may ensure that the SSD 72 is ready to service I/O requests much sooner after SSD 72 power-on without incurring high latencies when a segment of the L2P table 80 has not yet been loaded. Some embodiments may also enable a zero power-state during SSD 72 idle times.

Some embodiments of the system 70 may provide non-sequential priority-based loading, non-priority sequential loading, and out of turn loading of the L2P table 80 associated with the SSD 72. Table segments may then be loaded first in priority order and then sequentially (e.g., interrupted as need by out of turn demand loading as needed). However, the SSD controller 76 may inform the host 71 that the SSD 72 is ready to be accessed even if the L2P table 80 has not yet been fully loaded. Thus, by signaling to the host that the SSD 72 is ready prior to full boot, the boot time may be dramatically reduced. The L2P segments corresponding to the set of boot/hiberfile LBAs may be loaded first, depending on the reason for the prior shutdown, followed by the L2P segments corresponding to the set of runtime LBAs (e.g., the most recently used LBAs prior to shutdown). Even in cases when access is sought for unloaded parts of the L2P table 80, latency may be reduced by loading the requested segment(s) out of turn. For example, on the occasions when an L2P access request is made for a part of the L2P table 80 that has not been loaded, the segment containing the requested logical block address (LBA) may be loaded out of turn to prevent excessive latency issues. Advantageously, loading the L2P segments corresponding to the set of runtime LBAs may reduce those occasions. The overall result is to allow access to the L2P table 80 much sooner than waiting for a full boot and also sooner than other storage devices which do not utilize priority-based L2P loading.

Because the boot-up time for the SSD 72 can be significantly reduced, some embodiments may power the SSD 72 down during system idle times without experiencing significant latency issues. Powering the SSD 72 down during idle times may result in significant power savings for the overall system 70 which may be especially beneficial when the system 70 is implemented in a battery powered device. When the SSD 72 is powered down, the state and context information for the SSD 72 may be saved to NVM. Upon being powered back up, the state and context information and the L2P table 80 may be loaded as described in the embodiments herein.

Various embodiments disclose an apparatus, system, and method for implementing a boot-up process for an SSD 72. The system may include a processor 73 communicatively coupled with additional system components and operative to execute software programs. The SSD 72 may include an L2P table 80 comprising an address mapping schema for translating logical block addresses (LBAs) to physical addresses in the SSD 72. The L2P table 80 may be partitioned into multiple table segments in which each of the multiple segments may include a sequential grouping of LBAs. The SSD control hardware/software/firmware communicatively coupled with the processor 73 may be operative to cycle power to the SSD 72. In some embodiments, a partial boot-up for the SSD 72 may be performed.

The partial boot-up may not include loading of the L2P table 80. Once the partial boot-up is complete, the host 71 may be signaled that the SSD 72 is ready to process access requests. The access requests may be function calls handled by the processor 73 and forwarded to the SSD 72 by way of the SSD control hardware/software/firmware and the SSD controller 76. The SSD controller 76 may cause the loading of the multiple segments into the L2P table 80 in a priority manner (e.g., a hardcoded priority, a table-based priority, a configurable priority, etc.) based on prior state and/or drive context information. While loading the table segments, an access request specifying a LBA within an unloaded segment may be received at the SSD 72. The SSD 72 may handle the access request by loading the unloaded segment into the L2P table 80 out of turn before resuming the loading of the multiple segments into the L2P table 80 in the priority manner.

The SSD 72 may be able to receive an access request in which the access request includes a LBA. Upon determining the segment associated with the LBA, the SSD controller 76 may verify whether the segment associated with the LBA in the access request has been loaded. If the segment has been loaded, the SSD 72 may then service the access request for that LBA.

The SSD 72 may be powered down when not in use. For example, the SSD 72 may be powered down when the processor 73 determines an idle state for the SSD 72 or if the SSD 72 itself determines an idle state. The SSD 72 may be powered back up when the processor 73 or other system component determines the SSD 72 is needed.

Embodiments of the system 10, the apparatus 20, the method 30, the system 40, the method 60, and the system 70 may be implemented in any useful electronic device. Non-limiting examples of a suitable device may include a server, a workstation, a desktop computer, a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, wearable device, and so forth.

While some of the foregoing embodiments have been described in an example context of a device managed NAND-based SSD with a full L2P table, other embodiments may alternatively, or additionally, be applied to SSDs based on other media, host-managed SSDs, L2P-paged SSDs, storage systems utilizing a host-memory-buffer, other indirection structures, etc.

ADDITIONAL NOTES AND EXAMPLES

Example 1 may include an electronic processing system, comprising a processor, persistent storage media communicatively coupled to the processor, and logic communicatively coupled to the persistent storage media to determine prior state information corresponding to one or more of a power state, a system state, a device state, and an operating system state, and load an indirection structure for the persistent storage media in the background based on the prior state information.

Example 2 may include the system of Example 1, wherein the logic is further to receive an indication of a transition related to the persistent storage media and state information related to the transition, and save the transition-related state information prior to the transition.

Example 3 may include the system of Example 1, wherein the logic is further to determine prior media context information, and load the indirection structure in the background based on the prior state information and the prior media context information.

Example 4 may include the system of Example 3, wherein the logic is further to prioritize a first portion of the indirection structure to be loaded before a second portion of the indirection structure based on one or more of the prior state information and the prior media context information.

Example 5 may include the system of Example 3, wherein the logic is further to save a set of recently used logical block addresses as part of the prior media context information.

Example 6 may include the system of any of Examples 1 to 5, wherein the persistent storage media comprises a solid-state drive and wherein the indirection structure comprises a logical to physical translation table.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to determine prior state information corresponding to one or more of a power state, a system state, a device state, and an operating system state, and load an indirection structure for a persistent storage media in the background based on the prior state information.

Example 8 may include the apparatus of Example 7, wherein the logic is further to receive an indication of a transition related to the persistent storage media and state information related to the transition, and save the transition-related state information prior to the transition.

Example 9 may include the apparatus of Example 7, wherein the logic is further to determine prior media context information, and load the indirection structure in the background based on one or more of the prior state information and the prior media context information.

Example 10 may include the apparatus of Example 9, wherein the logic is further to prioritize a first portion of the indirection structure to be loaded before a second portion of the indirection structure based on one or more of the prior state information and the prior media context information.

Example 11 may include the apparatus of Example 9, wherein the logic is further to save a set of recently used logical block addresses as part of the prior media context information.

Example 12 may include the apparatus of any of Examples 7 to 11, wherein the persistent storage media comprises a solid-state drive and wherein the indirection structure comprises a logical to physical translation table.

Example 13 may include a method of controlling a persistent storage device, comprising determining prior state information corresponding to one or more of a power state, a system state, a device state, and an operating system state, and loading an indirection structure for a persistent storage media in the background based on the prior state information.

Example 14 may include the method of Example 13, further comprising receiving an indication of a transition related to the persistent storage media and state information related to the transition, and saving the transition-related state information prior to the transition.

Example 15 may include the method of Example 13, further comprising determining prior media context information, and loading the indirection structure in the background based on one or more of the prior state information and the prior media context information.

Example 16 may include the method of Example 15, further comprising prioritizing a first portion of the indirection structure to be loaded before a second portion of the indirection structure based on one or more of the prior state information and the prior media context information.

Example 17 may include the method of Example 15, further comprising saving a set of recently used logical block addresses as part of the prior media context information.

Example 18 may include the method of any of Examples 13 to 17, wherein the persistent storage media comprises a solid-state drive and wherein the indirection structure comprises a logical to physical translation table.

Example 19 may include at least one computer readable medium, comprising a set of instructions, which when executed by a computing device, cause the computing device to determine prior state information corresponding to one or more of a power state, a system state, a device state, and an operating system state, and load an indirection structure for a persistent storage media in the background based on the prior state information.

Example 20 may include the at least one computer readable medium of Example 19, comprising a further set of instructions, which when executed by the computing device, cause the computing device to receive an indication of a transition related to the persistent storage media and state information related to the transition, and save the transition-related state information prior to the transition.

Example 21 may include the at least one computer readable medium of Example 19, comprising a further set of instructions, which when executed by the computing device, cause the computing device to determine prior media context information, and load the indirection structure in the background based on one or more of the prior state information and the prior media context information.

Example 22 may include the at least one computer readable medium of Example 21, comprising a further set of instructions, which when executed by the computing device, cause the computing device to prioritize a first portion of the indirection structure to be loaded before a second portion of the indirection structure based on one or more of the prior state information and the prior media context information.

Example 23 may include the at least one computer readable medium of Example 21, comprising a further set of instructions, which when executed by the computing device, cause the computing device to save a set of recently used logical block addresses as part of the prior media context information.

Example 24 may include the at least one computer readable medium of any of Examples 19 to 23, wherein the persistent storage media comprises a solid-state drive and wherein the indirection structure comprises a logical to physical translation table.

Example 25 may include a storage controller apparatus, comprising means for determining prior state information corresponding to one or more of a power state, a system state, a device state, and an operating system state, and means for loading an indirection structure for a persistent storage media in the background based on the prior state information.

Example 26 may include the apparatus of Example 25, further comprising means for receiving an indication of a transition related to the persistent storage media and state information related to the transition, and means for saving the transition-related state information prior to the transition.

Example 27 may include the apparatus of Example 25, further comprising means for determining prior media context information, and means for loading the indirection structure in the background based on one or more of the prior state information and the prior media context information.

Example 28 may include the apparatus of Example 27, further comprising means for prioritizing a first portion of the indirection structure to be loaded before a second portion of the indirection structure based on one or more of the prior state information and the prior media context information.

Example 29 may include the apparatus of Example 27, further comprising means for saving a set of recently used logical block addresses as part of the prior media context information.

Example 30 may include the apparatus of any of Examples 25 to 29, wherein the persistent storage media comprises a solid-state drive and wherein the indirection structure comprises a logical to physical translation table.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
persistent storage media communicatively coupled to the processor; and
logic communicatively coupled to the persistent storage media to:
determine prior state information corresponding to one or more of a power state, a system state, a device state, or an operating system state,
prioritize a first portion of an indirection structure for the persistent storage media to be loaded before a second portion of the indirection structure based on the prior state information, and
load the indirection structure for the persistent storage media in a background based on the prior state information to load the first portion before the second portion.

2. The system of claim 1, wherein the logic is further to:
receive an indication of a transition related to the persistent storage media and state information related to the transition; and
save the transition-related state information prior to the transition.

3. The system of claim 1, wherein the logic is further to:
determine prior media context information; and
load the indirection structure in the background based on the prior media context information.

4. The system of claim 3, wherein the logic is further to:
prioritize the first portion of the indirection structure to be loaded before the second portion of the indirection structure based on the prior media context information.

5. The system of claim 3, wherein the logic is further to:
save a set of recently used logical block addresses as part of the prior media context information.

6. The system of claim 1, wherein the persistent storage media comprises a solid-state drive and wherein the indirection structure comprises a logical to physical translation table.

7. A semiconductor package apparatus, comprising:
a substrate; and
logic coupled to the substrate, wherein the logic is at least partly implemented in one or more of configurable logic or fixed-functionality hardware logic, the logic coupled to the substrate to:
determine prior state information corresponding to one or more of a power state, a system state, a device state, or an operating system state,
prioritize a first portion of an indirection structure for a persistent storage media to be loaded before a second portion of the indirection structure based on the prior state information, and
load the indirection structure for the persistent storage media in a background based on the prior state information to load the first portion before the second portion.

8. The apparatus of claim 7, wherein the logic is further to:
receive an indication of a transition related to the persistent storage media and state information related to the transition; and
save the transition-related state information prior to the transition.

9. The apparatus of claim 7, wherein the logic is further to:
determine prior media context information; and
load the indirection structure in the background based on the prior media context information.

10. The apparatus of claim 9, wherein the logic is further to:
prioritize the first portion of the indirection structure to be loaded before the second portion of the indirection structure based on the prior media context information.

11. The apparatus of claim 9, wherein the logic is further to:
save a set of recently used logical block addresses as part of the prior media context information.

12. The apparatus of claim 7, wherein the persistent storage media comprises a solid-state drive and wherein the indirection structure comprises a logical to physical translation table.

13. A method of controlling a persistent storage device, comprising:
determining prior state information corresponding to one or more of a power state, a system state, a device state, or an operating system state;
prioritizing a first portion of an indirection structure for a persistent storage media to be loaded before a second portion of the indirection structure based on the prior state information; and
loading the indirection structure for the persistent storage media in a background based on the prior state information to load the first portion before the second portion.

14. The method of claim 13, further comprising:
receiving an indication of a transition related to the persistent storage media and state information related to the transition; and
saving the transition-related state information prior to the transition.

15. The method of claim 13, further comprising:
determining prior media context information; and
loading the indirection structure in the background based on the prior media context information.

16. The method of claim 15, further comprising:
prioritizing the first portion of the indirection structure to be loaded before the second portion of the indirection structure based on the prior media context information.

17. The method of claim 15, further comprising:
saving a set of recently used logical block addresses as part of the prior media context information.

18. The method of claim 13, wherein the persistent storage media comprises a solid-state drive and wherein the indirection structure comprises a logical to physical translation table.

19. At least one non-transitory computer readable medium, comprising a set of instructions, which when executed by a computing device, cause the computing device to:
determine prior state information corresponding to one or more of a power state, a system state, a device state, or an operating system state;

prioritize a first portion of an indirection structure for a persistent storage media to be loaded before a second portion of the indirection structure based on the prior state information; and load the indirection structure for the persistent storage media in a background based on the prior state information to load the first portion before the second portion.

20. The at least one non-transitory computer readable medium of claim 19, comprising a further set of instructions, which when executed by the computing device, cause the computing device to:

receive an indication of a transition related to the persistent storage media and state information related to the transition; and save the transition-related state information prior to the transition.

21. The at least one non-transitory computer readable medium of claim 19, comprising a further set of instructions, which when executed by the computing device, cause the computing device to:

determine prior media context information; and load the indirection structure in the background based on the prior media context information.

22. The at least one non-transitory computer readable medium of claim 21, comprising a further set of instructions, which when executed by the computing device, cause the computing device to:

prioritize the first portion of the indirection structure to be loaded before the second portion of the indirection structure based on the prior media context information.

23. The at least one non-transitory computer readable medium of claim 21, comprising a further set of instructions, which when executed by the computing device, cause the computing device to:

save a set of recently used logical block addresses as part of the prior media context information.

24. The at least one non-transitory computer readable medium of claim 19, wherein the persistent storage media comprises a solid-state drive and wherein the indirection structure comprises a logical to physical translation table.

* * * * *